United States Patent [19]

Gallagher et al.

[11] Patent Number: 5,540,981
[45] Date of Patent: Jul. 30, 1996

[54] INORGANIC-CONTAINING COMPOSITES

[75] Inventors: Michael K. Gallagher; Larry Manziek, both of Lansdale; Eric J. Langenmayr, Laverock, all of Pa.

[73] Assignee: Rohm and Haas Company, Philadelphia, Pa.

[21] Appl. No.: 251,535

[22] Filed: May 31, 1994

[51] Int. Cl.$^6$ ............... B32B 9/00; B32B 19/00
[52] U.S. Cl. ............... 428/220; 257/13; 427/226; 427/229; 428/688; 428/689; 428/697; 429/12; 502/100; 505/150
[58] Field of Search ............... 427/226, 229; 428/688, 689, 206, 208, 209, 210, 220, 697; 505/150; 257/13; 429/12; 502/100

[56] References Cited

U.S. PATENT DOCUMENTS

| | | | |
|---|---|---|---|
| 4,040,990 | 8/1977 | Neely | 528/481 X |
| 4,123,396 | 10/1978 | Rembaum et al. | 526/24 |
| 4,152,386 | 5/1979 | Winter | 264/108 |
| 4,188,214 | 2/1980 | Kido et al. | 430/494 |
| 4,191,812 | 3/1980 | Chong | 521/28 |
| 4,197,220 | 4/1980 | Rembaum et al. | 525/337 X |
| 4,200,695 | 4/1980 | Chong et al. | 521/28 |
| 4,252,890 | 2/1981 | Haas et al. | 430/292 |
| 4,303,554 | 12/1981 | Sudo et al. | 252/518 |
| 4,312,956 | 1/1982 | Chong et al. | 521/28 |
| 4,359,537 | 11/1982 | Chong | 521/29 |
| 4,380,590 | 4/1983 | Chong | 521/33 |
| 4,419,490 | 12/1983 | Bayer et al. | 525/420 |
| 4,639,396 | 1/1987 | Semsarzadeh | 428/373 |
| 4,719,145 | 1/1988 | Neely | 428/327 |
| 4,810,547 | 3/1989 | Minami et al. | 428/65 |
| 4,857,493 | 8/1989 | Ford et al. | 502/158 |
| 4,931,427 | 6/1990 | Chien | 505/1 |
| 5,011,956 | 4/1991 | Ford et al. | 552/304 |
| 5,024,894 | 6/1991 | Chien | 428/433 |
| 5,030,391 | 7/1991 | Sumita et al. | 264/5 |
| 5,081,092 | 1/1992 | Chattha et al. | 502/159 |
| 5,086,026 | 2/1992 | Chattha et al. | 502/159 |
| 5,171,735 | 12/1992 | Chien | 505/1 |
| 5,188,923 | 2/1993 | Ahn et al. | 430/290 X |
| 5,252,255 | 10/1993 | Moy et al. | 427/337 X |
| 5,314,988 | 5/1994 | Chien | 528/353 |
| 5,318,800 | 6/1994 | Gong et al. | 427/229 |
| 5,338,334 | 8/1994 | Zhen et al. | 75/362 |

FOREIGN PATENT DOCUMENTS

| | | |
|---|---|---|
| 531005 | 3/1993 | European Pat. Off. . |
| 2241244 | 8/1991 | United Kingdom . |

OTHER PUBLICATIONS

"Colloidal Dispersions of Platinum and Palladium Clusters Embedded in the Micelles, Preparation and Application to the Catalysis for Hydrogenation of Olefins," N. Toshima and T. Takahashi, Bulletin of the Chemical Society of Japan, vol. 65, pp. 400–409 (1992).

"Adsorption of Surfactant–Stabilized Colloidal Noble Metals by Ion–Exchange Resins and Their Catalytic Activity for Hydrogenation", Y. Nakao and K. Kaeriyama, Journal of Colloidal and Interface Science, vol. 131, pp. 186–191 (1989).

"Pyrolysis of Polymer Complexes Leading to Air–Stable Ultrafine Metal Particles Uniformly Dispersed in a Carbon Matrix", S. Miyanaga, et al., J. Macromol. Sci.–Chem, A27(9–11), pp. 1347–1361 (1990).

"Poly(Methacrylate) Precursors to Forsterite", M. Martin, et al., Journal of American Ceramics Society, vol. 75(7), pp. 1831–1838 (1992).

"Formation of Theoretical–Density Microhomogeneous YBa2Cu3O7–4 Using a Microemulsion–Mediated process", P. Ayyub, et al., Physica C, vol. 168, pp. 571–579 (1990).

"Polymer–Dispersed Metal Catalysts, I. Relationship Between Polymer Functionality, Selectivity and Rate of Hydrogenation", G. Bar–Sela and A. Warshawsky, Reactive Polymers, vol. 1, pp. 149–153 (1983).

"Preparation of Bi–Pb–Sr–Ca–Cu–O Oxide Superconductors by Coprecipitation of Nanosize Oxalate Precursor Powders in the Aqueous Core of Water–In–Oil Microemulsions", P. Kumar, et al. Appl. Phys. Lett., vol. 62 (7), pp. 765–767 (1993).

"Synthesis of LaMnO3 Using poly(Acrylic Acid)", H. Taguchi, et al., Journal of Materials Science Letters, vol. 12, pp. 891–893 (1993).

"Co Hydrogenation Over TiO2–Supported Ultrafine Fe3O4 Particle Catalyst Prepared by a Colloid Chemical Method", B. Chang et al., Bulletin of the Chemical Society of Japan, vol. 64, pp. 2270–2274 (1991).

Primary Examiner—Michael Lusignan
Attorney, Agent, or Firm—David T. Banchik

[57] ABSTRACT

Composites, and a method for preparing composites, are provided. The composites have a plurality of domains of inorganic compounds of from 0.4 to 1000 nanometers on the surfaces of a support material. The domains may contain one or more inorganic compounds, the ratio of which can be controlled by the process.

24 Claims, No Drawings

INORGANIC-CONTAINING COMPOSITES

The present invention relates to inorganic-containing composites. In particular, the present invention relates to inorganic-containing composites having predetermined levels of one or more inorganic compounds spatially arranged on a substrate.

As used herein, "inorganic compounds" refers to metals, metallic alloys, metal oxides, metal borides, metal carbides, metal silicides, metal nitrides, metal sulfides, metal selenides, and mixtures thereof.

As used herein, "domain" refers to a localized two- or three-dimensional region comprising a population of one or more inorganic compounds, on a support material wherein the elemental composition within the region differs from the elemental composition of the support material.

In many applications where metals, particularly precious metals, are used, it is desirable to be able to use the metals efficiently. Thus, it is desirable to control the amount of metal needed to prepare the final product and to control the extent to which the metal occupies useful sites. In the manufacturing of catalysts, for example, it is desirable to control the ratio of the one or more metals on the surface of the catalyst and, in particular, to control the ratio of the one or more metals within a given domain on the surface of the catalyst. In heterogeneous catalysts, it is also desirable to control the size of the domains, the location of the domains, the spacing of the domains and the stability of the domains. Because metal/support interactions affect the performance of catalysts, the inability to control the size, spacing and location of domains has been a persistent problem in the manufacture of high performance catalysts.

One of the conventional methods for preparing heterogeneous catalysts containing one or more inorganic compounds, such as metals or metal oxides, is by impregnating a catalyst support. One known method for impregnating catalyst supports is by incipient wetness. The efficiency of the impregnation of a catalyst support with a metal or metal oxide to form a catalyst is a function of the interactive nature of the catalyst support with the metal or metal oxide. This method suffers the drawbacks of uncontrolled domain size, distribution and composition. Furthermore, the domains formed by impregnation methods generally have inferior thermal stability and will sinter upon exposure to elevated temperatures.

Many catalysts also require particular stoichiometric ratios of two or more metals or metal oxides. Many attempts have been made to control the stoichiometric ratios of two or more metals or metal oxides on a surface, such as by sputtering techniques, or sol-gel processing. Sputtering is a complex technique, requiring the use of expensive equipment and difficult operating procedures. Furthermore, sputtering results in the formation of a film only upon the surface of a substrate. Also, sputtering is not capable of producing on a surface the discrete domains which are required of many applications. Sol-gel processing suffers from limitations due to the relative solubilities of the various metals salts and metal alkoxides. Furthermore, controlling the stoichiometric ratios of two or more metals or metal oxides using sol-gel processing is complicated by the differing hydrolysis or precipitation rates of the precursors.

Certain applications, such as structural ceramics and corrosion resistant alloys, benefit from particular sizes of domains containing two or more metals or metal oxides. Previous attempts to control (or tailor) the size of metal and metal oxide domains have been unsuccessful at achieving domains having a diameter below about 100 nanometers. For example, powders of metals or mixed metals which can be deposited on a surface to form a domain, generally have a particle size greater than 100 nanometers and usually greater than 1,000 nanometers. The known methods for creating domains containing two or more metals or metal oxides also suffer from the drawback of the inability to control the stoichiometric make-up of the domains, and the spatial distribution of the metals or metal oxides within the domains.

Other applications, such as catalysts, sintering aids and grain growth inhibitors, benefit from particular location or spacings of domains upon a substrate. For example, many techniques, such as sputtering, are only, suitable for generating domains on the surface of a substrate, but are ineffective for generating domains in other locations such as within the pore structure of the substrate, and are therefore also ineffective for controlling the spacing of domains within the pores. Furthermore, most of these techniques are deficient in that the domains lack stability, particularly under elevated temperature.

U.S. Pat. Nos. 5,086,026 and 5,081,092 disclose a method of making improved catalysts. The method requires the preparation of an amino polymer from an amine and an epoxy resin. The amino polymer is dissolved in a suitable solvent, and the solution is used to coat a substrate either before or after the substrate has been coated with a catalytic metal. This method is complex, requires many steps and does not address the problems of controlling the stoichiometry or placement of domains on the substrate.

The present invention seeks to overcome the problems associated with known methods for controlling the chemical composition, size, spacing and location of metallic domains.

In a first aspect of the present invention, there is provided a method for making a composite, comprising:

(a) forming one or more metal-loaded polymers by loading one or more soluble metal compounds into each of one or more polymers wherein each of the one or more polymers has a particle size in the range of from 10 nanometers to 15,000 nanometers to form one or more metal-loaded polymers;

(b) contacting a support material with each of the one or more metal-loaded polymers; and (c) removing the one or more polymers to form a composite.

In a second aspect of the present invention, there is provided a method for making a composite, comprising:

(a) forming a first set of one or more polymers by loading one or more soluble metal compounds into each of one or more polymers wherein each of the polymers has a particle size in the range of from 10 nanometers to 15,000 nanometers to form a first set of one or more metal-loaded polymers;

(b) forming a second set of one or more metal-loaded polymers by loading one or more soluble metal compounds into each of one or more polymers wherein each of the polymers has a particle size in the range of from 10 nanometers to 15,000 nanometers to form a second set of one or more metal-loaded polymers;

(c) contacting a support material with the first set of one or more metal-loaded polymers;

(d) removing the polymer to form a composite;

(e) contacting the second set of one or more metal-loaded polymers with the composite of (d) above; and (f) removing the polymer to form a composite.

In a third aspect of the present invention, there is provided a metal-containing composite, comprising:

(a) a support material having one or more surfaces capable of supporting domains; and (b) a plurality of domains on the one or more surfaces of the support material, wherein the domains comprise one or more inorganic compounds, and wherein the domains have a diameter of from 0.4 to 100 nanometers.

In a fourth aspect of the present invention, there is provided a composite, comprising:

(a) a support material having one or more surfaces capable of supporting domains; and (b) a plurality of domains on the one or more surfaces of the support material, wherein the domains comprise two or more inorganic compounds, and wherein the domains have a diameter of from 0.4 to 1,000 nanometers.

Polymers useful in the present invention have a particle size in the range of from 10 nanometers to 15,000 nanometers, preferably, the polymers from 30 to 12,000 nanometers, and most preferably from 50 to 10,000 nanometers. If the polymers are too small, they are difficult to work with because they tend to agglomerate. If the polymers are too large, they tend not to become stably bound to the substrate.

A suitable process for preparing polymers having a particle size in the range of from 10 nanometers to 15,000 nanometers is, for example, by an emulsion polymerization processes. Polymers prepared by emulsion polymerization processes are referred to hereafter and in the appended claims as "emulsion polymers." Emulsion polymerization processes are well known to those of ordinary skill in that art. For example, U.S. Pat. No. 4,359,537 to Chong (hereafter "Chong"), the disclosure of which is hereby incorporated by reference, teaches an emulsion polymerization process for producing emulsion polymers useful in the present invention. The emulsion polymers taught by Chong are functionalized polymers prepared by emulsion polymerization processes having particle sizes in the size range which is useful for the present invention.

Other suitable processes for preparing polymers having a particle size in the range of from 50 nanometers to 15,000 nanometers include, for example, grinding or pulverizing ion-exchange resins prepared by suspension polymerization processes, and grinding or pulverizing polymers prepared by bulk polymerization. Polymers prepared by suspension polymerization processes are referred to hereafter and in the appended claims as "suspension polymers." Suspension polymerization processes are well-known to those skilled in the art, and include, for example, processes for making gellular resins and macroreticular resins such as those taught in U.S. Pat. Nos. 4,382,124, 4,486,313, 4,501,826 and 4,224,415 to Meitzner, et al., herein incorporated by reference.

The polymers useful in the present invention may be of any morphology. For example, the polymers may be spherical, irregularly shaped, rod-like, hollow, core/shell, oblate or multi-lobal. Preferably, the polymers are substantially spherical. Furthermore, the polymer may be used in the form of an emulsion, suspension or powder.

The polymers useful in the present invention preferably contain functional groups capable of complexing with the one or more soluble metal compounds. When present, the one or more functional groups of the polymers useful in the present invention may result, for example, from the use of functional monomers, from the use of monomers which contain protected (or latent) functional groups which are subsequently deprotected, from functionalizing non-functional moieties of the polymer after polymerization, or a combination thereof. Suitable functional groups include, for example, weakly acidic, strongly acidic, weakly basic, strongly basic, reducing or coordinating functional groups. In other words, polymers may be prepared as ion exchange resins or polymeric adsorbents. Furthermore, polymers can be functionalized directly, as by hydrolysis, sulfonation, and similar reaction, or indirectly by such reactions as chloromethylation followed by a functionalization reaction such as amination.

In general, the reactions employed to functionalize emulsion copolymer ion exchange resins are the same as those used to produce ion exchange resins from conventional, suspension-polymerized copolymers. As a high degree of functionalization is desirable because it produces a large number of functional ion exchange sites per unit weight of resin, the polymers useful in the present invention are preferably functionalized to between 0.1 and 2.0 functional groups per monomer unit. The more preferred range is from 0.3 to 1.2 functional groups per monomer unit. The term, "functional groups per monomer unit", as used herein, refers to the number of functional groups per total monomer units, both "backbone", monoethylenically unsaturated monomer and crosslinking, polyethylenically unsaturated monomer. For example, in the case of an aromatic backbone monomer and aromatic crosslinker monomer used to prepare a copolymer, this term would refer to the number of functional groups per aromatic ring in the polymer. Similarly, in the case of a copolymer with a functionalized acrylic backbone and an unfunctionalized aromatic crosslinker, the degree of functionalization will be the functional ion exchange groups per total monomer units, both acrylic and aromatic. The degree of functionalization may be thought of as the number of functional groups per mole of all the monomers which constitute the polymer. Some of the typical processes for functionalizing the polymer are described in paragraphs (a)–(d) below:

(a) Strongly acidic polymers may be prepared, for example, by heating styrene-containing or substituted styrene-containing polymers with concentrated sulfuric acid to produce a sulfonic acid-functionalized polymer.

(b) Weakly acidic polymers may be prepared, for example, by hydrolyzing crosslinked acrylic ester emulsion copolymers with alkali metal hydroxide solutions to form carboxylic acid-functionalized polymers. The carboxylic acid-functionalized polymer produced by this procedure is in the alkali metal form and may be converted to the free acid (hydrogen) form by contacting it with a conventional, strongly acidic cation polymer in the hydrogen form. Similarly, acrylic ester polymers may be hydrolyzed with strong acids to produce carboxylic acid-functionalized polymers in the hydrogen form.

(c) Strongly basic polymers may be prepared, for example, by chloromethylating styrene-containing emulsion polymers with chloromethyl methyl ether in the presence of a Lewis acid such as aluminum chloride, and treating the resulting intermediate polymer with a tertiary amine such as trimethylamine to form a quaternary amine chloride functional group. Alternatively, a strongly basic quaternary amine polymer may be prepared by treating a crosslinked acrylic ester polymer with a diamine containing both a tertiary amine group and a primary or secondary amine group, such as dimethylaminopropylamine or di(3-dimethylaminopropyl)amine and quaternizing the resulting weakly basic polymer with an alkyl halide such as methyl chloride.

(d) Weakly basic polymers may be prepared, for example, in the same manner described for strongly basic resins, except that for a styrene polymer, primary or secondary amines are employed instead of tertiary amines, and for an acrylic ester polymer, the polymer is not quaternized with an alkyl halide.

Soluble metal compounds suitable for the present invention include metals, metal ions, metal complexes, and organometallic compounds which are at least partially soluble in the polymer matrix or in an aqueous polymer emulsion or dispersion. Preferably, the one or more soluble metal compounds are completely soluble in the aqueous polymer emulsion or dispersion. Suitable metals include alkali, alkaline earth, transition, main group and lanthanide metals. The choice of the metals, metal ions, metal complexes, and organometallic compounds will depend upon which metal(s) or metal oxide(s) are desired in the domains of the final product. For example, if the desired final product is a catalyst, the preferred metals, metal ions, metal complexes, and organometallic compounds are those of catalytically active metals or metal oxides. Preferred catalytically active metals or metal oxides include platinum, palladium, rhodium, rhenium, ruthenium, osmium, iridium, cerium, zirconium, titanium, vanadium, molybdenum, tungsten, lanthanum, aluminum, yttrium, nickel, tin, bismuth, copper, cobalt, iron, silver, gold, salts, oxides, and mixtures thereof. Examples of suitable soluble metal ions include $Ce^{3+}$, $Ni^{2+}$, $Zr^{4+}$, $La^{3+}$, $Al^{3+}$ and $Y^{3+}$. Examples of suitable soluble metal complexes include $RuCl^3$, $RhCl_3$, $[PtCl_6]^{2-}$, $[Pt(NH_3)_4]^{2+}$, $[PdCl_4]^{2-}$, $Fe(CO)^{4-}$, $[Ru(NH_3)_6]^{3+}$, $[MoO_4]^{2-}$, and $[Mo_6O^{19}]^{2-}$. Examples of suitable soluble organometallic compounds include ferrocene, $Pt(PPh_3)_4$, $[Pt(NH_3)_2(C_2H_4)]$.

As stated above, the one or more soluble metal compounds are loaded into the polymer to form a metal-loaded polymer. "Loading" a polymer with one or more soluble metal compounds refers to combining the polymer with the one or more soluble metal compounds so that either the functional groups of the polymer are complexed with one or more soluble metal compounds, or the polymer matrix solubilizes the one or more soluble metal compounds, or a combination thereof. Complexing between the polymer and the one or more soluble metal compounds may occur by such mechanisms as, for example, ion-exchange, chelation, oxidative addition, π-bonding, hydrogen bonding and dative bonding. Soluble metal compounds are preferably introduced into, onto, and throughout the polymers utilizing the ion exchange properties of a polymer. When a metal salt is used, following the ion exchange of the metal salt into, onto and throughout the polymer, it is possible, although not necessary, to reduce the metal salt using any suitable reducing agent. The distribution of the one or more soluble metal compounds may depend on the structure of the polymer used. For example, if a polymer having a core/shell morphology is used, the concentration of soluble metal compounds in the core may differ from the concentration of soluble compounds in the shell because of, for example, different types or degrees of functionality in the core relative to the shell. Preferably, the soluble metal compounds are distributed uniformly throughout the polymer matrix. The soluble metal compounds are preferably introduced into, onto and throughout the polymer by simply mixing a colloidal dispersion or emulsion of the polymers with the soluble metal compounds. It is understood by those of ordinary skill in the art that the polymer dispersion or emulsion should be in a suitable form such that the soluble metal compounds will complex with the polymer. For example, if a carboxylic acid-containing polymer is used, the pH of the polymer (or polymer emulsion or polymer dispersion) should be greater than 8 to deprotonate the carboxylic acid groups so that the polymer can complex with soluble cationic metals or metal complexes. Preferably, the one or more soluble metal compounds are loaded into the polymer by forming an aqueous mixture of from 0.1 to 70 percent by weight of the polymer and the one or more soluble metal compounds, and wherein the polymer and the one or more soluble metal compounds are present in a weight ratio in the range of from 1:0.001 to 1:3. More preferably, the one or more soluble metal compounds are loaded into the polymer by forming an aqueous mixture of from 1 to 40 percent by weight of the polymer and the one or more soluble metal compounds, and wherein the polymer and the one or more soluble metal compounds are present in a weight ratio in the range of from 1:0.01 to 1:1.

After the one or more soluble metal compounds have been loaded into the polymer, it may be desirable to reduce or precipitate them in the metal-loaded polymer. The metal-loaded polymer may then be loaded with additional soluble metal compounds. In the case of metal ions and metal complexes of gold, copper, silver, and metals of the platinum group, it is possible to reduce these metal ion and metal complexes to their corresponding metal. This can be accomplished by any suitable reducing agent such as, for example, hydrogen, formaldehyde, hydrazine, carbon monoxide, formic acid and other reducing agents well known to those skilled in the art. It is also possible that the polymer may contain functional groups capable of reducing the soluble metal compounds to the metal. For example, the polymers disclosed in U.S. Pat. No. 4,355,140 to Manziek, hereby incorporated by reference, are capable of reducing certain soluble metal compounds to the corresponding metals.

The metal-loaded polymers are preferably used in the form of an aqueous suspension, emulsion, or dispersion. If desired, the metal-loaded polymer may be isolated prior to contacting the metal-loaded polymer with the support material. Suitable methods for isolating the metal-loaded polymer include, for example, spray-drying, freeze-drying, evaporating, filtering, flocculating, precipitating, centrifuging and dialyzing.

In the process of the present invention, the metal-loaded polymer is contacted with a support material having one or more surfaces capable of supporting domains. The support material, or substrate, is, or becomes, stable under the conditions under which the polymer of the metal-containing polymer is removed. Suitable support materials include metals, metal oxides, metal carbides, metal nitrides, metal borides, metal silicides, carbonaceous materials, thermally stable polymers and composites thereof. Specific examples of suitable support materials include steel, platinum, titanium, silicon, alumina, magnesium oxide, titanium oxide, zirconium oxide, cerium oxide, silicon oxide, cordierite, zeolites, mullite, glass, graphite, amorphous carbon, silicon nitride, silicon carbide, tungsten carbide, nickel boride, thermally stable plastics such as polycarbonate, polyperfluoroethylene, polysulfones and polyimides. Preferred support materials include, for example, cordierite, steel, alumina and amorphous carbons. Preferably, the support material has a surface area up to 1,500 m2/g, more preferably from 1 to 800 $m^2/g$. If the support material is a powdered, granular or spherical solid, the support material preferably has an average particle size of from 10 nm to 1 millimeter, more preferably from 100 nm to 100 microns. The support material may also be in the form of a sheet, monolith, fiber, mesh, weave or other regular or irregular shapes. In one embodiment of the invention, one or more metal-loaded polymers and one or more non-metal loaded polymers are contacted with a support material.

Suitable methods for contacting the metal-loaded polymer with a support material include, for example, mixing the metal-loaded polymer in the presence of the support material, spraying the metal-loaded polymer onto a support material, spray-drying the metal-loaded polymer in conjunction with a slurried or suspended powdered support material, adsorbing the metal-loaded polymer onto an adsorbent support material, absorbing the metal-loaded polymer onto an absorbent support, flocculating the metal-loaded polymer with an appropriately charged and sized support material, electrodeposition of the metal-loaded polymer onto a conductive support, dipping a support into a solution or suspension of the metal-loaded polymer, painting the metal-loaded polymer onto the support material, using printing or other conventional coating techniques to deposit the metal-loaded polymer onto the support material. Preferred methods for contacting the metal-loaded polymer with a support material depend, in part, on the support material being used. If the support material is conductive, for example, a metal plate, metal wire, carbon fibers, or and the like, preferred contacting methods include electrodeposition, dipping, painting and printing. If the support material is, for example, a polymer, metal or ceramic structure, preferred contacting methods include adsorption, absorption, dipping, painting and floccing. If the support material is, for example, a powder such as carbon, polymers, metals, metal oxides or other ceramic powders, preferred contacting methods include coating, dipping, floccing, adsorption, absorption and spray drying the metal-loaded polymer in conjunction with the slurried or suspended powder.

The methods described above are suitable for contacting the metal-loaded polymer with a support material. If desired, the extent to which the metal-loaded polymers are contacted with the support material can be controlled by repeating or using various combinations of the contacting methods. For example, it may require several contacting steps to achieve a uniform film of metal-loaded polymer. Similarly, it may require several contacting steps to achieve a coating of desired thickness.

In one embodiment of the invention, a polymer having one or more soluble metal compounds are contacted with a substrate. In another embodiment of the present invention, two or more polymers, each containing one or more soluble metal compounds, are used. In the event two or more polymers are used, the polymers may be successively contacted, or they can be contacted with the substrate as a mixture, or the polymers can be aggregated or flocced prior to contacting the flocced or aggregated polymers with the substrate. After the metal-loaded polymer has been contacted with a support material, it may be desirable to securely affix the metal-loaded polymer to the support material. Suitable methods for securely affixing the metal-loaded polymer to the support material include, for example, crosslinking the metal-loaded polymers to themselves, crosslinking the metal-loaded polymers to other polymers, crosslinking the metal-loaded polymers to the support material, forming a film over the metal-loaded polymers, forming a coating over or among the metal-loaded polymers, and a combination thereof.

After the metal-loaded polymer has been contacted with a support material, the polymer is removed to form a composite. Suitable methods for removing the polymer include, for example, pyrolysis, dissolution, chemical degradation, irradiation and sonication. Preferably, the polymer is removed by pyrolysis. If the pyrolysis is conducted in an oxidizing atmosphere, such as air or nitrogen oxides, the polymer is preferably completely removed. If the pyrolysis is conducted in an inert atmosphere, such as nitrogen or argon, the polymer is converted into a carbonaceous material containing the inorganic compounds, and this carbonaceous material containing the inorganic compounds remains in contact with the support material, thus forming a composite. If the pyrolysis is conducted in a reducing atmosphere, such a silane ($SiH_4$), diborane ($B_2H_6$) or ammonia, the polymer is converted into a carbonaceous material containing the inorganic compounds, and the inorganic compounds can be converted to metals or the corresponding metal/heteroatom compound. If the support material is a polymer and the pyrolysis is conducted in an inert atmosphere, the entire composite may be a carbonaceous-based composite. Preferably, the pyrolysis is conducted in an oxidizing atmosphere at a temperature of from 250° C. to 1,000° C. for from 1 minute to 24 hours. In another embodiment of the invention, one or more metal-loaded polymers are contacted with the support material in the presence of one or more photoimageable polymers which allows for the preparation of a pattern of the metal-loaded polymers on the support material. Upon removal of the polymers, the domains will reflect the pattern of metal-loaded polymers. This process is useful for the manufacture of sensors, electrodes and energy storage devices.

In addition to removing the polymer, the pyrolysis may cause the soluble metal compounds from the metal-loaded polymer to sinter together to form domains. If desired, the composite can be subjected to higher temperatures or maintained at an elevated temperature for a longer period of time to allow the formation of domains. The domains may be crystallites of a single inorganic compound, or, if more than one type of soluble metal compound was used in the metal-containing polymers, the domains may contain two or more inorganic compounds in any of several phases including amorphous structures, crystalline structures, or combinations thereof.

After removing the polymer, it may be desirable to contact the composite with one or more metal-loaded polymers according to any of the methods described above. Subjecting the composites to additional contacting steps with one or more metal-loaded polymers provides another means for controlling, or microengineering, the stoichiometry of the domains on the composite. Additional contacting steps may also provide a means for creating three-dimensional inorganic compound structures on the surface of the composite.

The domains of the inorganic compounds may be discrete or interconnected. Depending upon the extent to which the domains might be interconnected, they may appear as dumbbells, chains of "necked" regions, or a tangled mass of conjoined substantially circular regions. Each domain generally has a diameter of from 0.4 nanometers to 1,000 nanometers, preferably from 0.8 nanometer to 700 nanometers. The size of the domains may depend on such factors as the pyrolysis conditions, the polymer size and composition, the level at which soluble metal compounds are present in the metal-loaded polymer, and the packing density of the metal-loaded polymer across the one or more surfaces of the substrate. The size of the domains may be affected by the pyrolysis conditions, for example, by increasing the temperature which may result in an increase in the size of the domains and oxidative conditions generally result in an increase in the size of the domains. The size of the domains may also be affected by the polymer composition, for example, certain functional groups, such as sulfonic acid, may lead to sintering of domains during pyrolysis. Also, higher packing densities of metal-loaded polymer on the substrate or higher levels of metal in the metal-loaded polymers generally result in larger domains.

The domains may contain two or more inorganic compounds and will generally reflect the stoichiometry of the soluble metal compounds present in the metal-loaded polymer or polymers. For example, if metal-loaded polymers are prepared with yttrium, barium and copper in a molar ratio of 1:2:3 which are then contacted with a support material, the domains formed as a result of the removal of the polymer will also have a molar ratio of yttrium to barium to copper of 1:2:3.

The present invention may also produce domains which contain alloys or solid solutions of two or more inorganic compounds. For example, gold and platinum can be present in the same or different metal-loaded polymer, which, when deposited on a substrate and pyrolyzed, may result in an alloy on the surface of the substrate. The formation of alloys may also be controlled, in part, by the pyrolysis conditions.

The domains formed by the present invention may be crystalline or amorphous. The crystalline phases may be different from the crystalline phases formed by other processes because they may be generated from different intermediates, or because the presence of the polymer may affect the resulting crystalline phase. Furthermore, the crystalline phase formed by the present invention may or may not be thermodynamically stable. For example, zirconium-loaded polymer, deposited on an alumina substrate and pyrolyzed, resulted in a tetragonal or cubic crystalline phase, whereas zirconia, prepared from precipitated zirconium hydroxide, results in a monoclinic phase. It should also be noted that the crystalline phase can be changed by subjecting the domains to elevated temperatures. The present invention can be used, for example, to prepare domains of zirconium oxide in a crystalline phase selected from tetragonal, cubic and a combination thereof, wherein the zirconium oxide contains less than about 3 percent by weight of any phase stabilizers, and is preferably substantially free of any phase stabilizers.

The domains formed by the present invention may be thermally stable to sintering as shown by the lack of significant grain growth after exposure to elevated temperatures. The stability of the domains on the substrate surface may, for example, be a function of the separation of the domains along the surface, stabilization of the domains by the substrate surface, or the presence of grain growth inhibitors which may be intentionally added or inadvertently present. When grain growth inhibitors are intentionally present, they may be introduced, for example, as a component of the metal-loaded polymer.

The domains formed by the present invention may be clustered on the one or more surfaces of the support material. A "cluster" may be described as a region where domains are relatively concentrated. The clusters may be discrete or conjoined. The size of the clusters generally approximates the diameter of the metal-loaded polymers. The clusters may contain, for example, as few as three or four domains, or the clusters may contain up to several hundred domains. When the substrate is contacted with metal-loaded polymers such that a coating of metal-loaded polymers is formed, or when a composite prepared by the present invention is contacted with metal-loaded polymers according to the present invention, it may be possible to prepare three-dimensional structures of clusters, wherein each cluster contains domains of inorganic compounds or combinations thereof.

The ability to control the size, spacing and stoichiometry of domains is useful in the manufacture of catalysts, for example, as catalysts for the conversion of exhaust gases from combustion sources such as, for example, automobile, diesel and stationary engines. For example, many automobile exhaust catalysts are prepared by depositing domains of catalytic metals on a honey-combed monolith as the catalyst support. The ability to control the size, spacing and stoichiometry of domains is also useful in the manufacture of fuel cells, chemical process catalysts, phase transfer catalysts, electrodes and sensors.

The present invention may also be useful, for example, to prepare emissivity coatings. Certain inorganic compounds are known to reflect or adsorb microwave radiation and radio frequencies. The present invention can be used to domains of inorganic compounds on surfaces where such properties are desired. For example, the interior surfaces of microwave ovens and electronic devices can be coated using the method of the present invention to render the surfaces impenetrable to microwave radiation or radio frequencies. Other coatings which can be prepared by this invention including energy absorptive coatings, energy reflective coatings, wear-resistant coatings, and coatings of electroluminescent materials (phosphors).

The present invention may also be useful, for example, in preparing toner particles. The domains deposited on a polymeric toner resin may make the toner resin pigmented or colored. Also, certain inorganic compounds are magnetic. If a polymeric toner resin contains magnetic domains, it may be possible to transfer images by delivering the toner via electromagnetic processes. Other applications which utilize colored or pigmented resins include, for example, cosmetic formulations, paints, lacquers, stains and other colored coatings.

The present invention is also useful in preparing advanced ceramic materials, including advanced electronic and optoelectronic ceramic materials. The present invention allows for the formation of domains of inorganic compounds of controlled stoichiometry and size. A specific mixed metal oxide is, for example, $YBa_2Cu_3O_{(7-x)}$, a well-known high temperature superconductor composition. The present invention can also be used to prepare other materials for electronic applications such as piezoelectric, ferroelectric, and non-linear optic materials. Some examples of these ceramics include, $BaTiO_3$, PZLT (lanthanum-doped lead zirconium titanate), and $LiNbO_3$.

The present invention may also be useful, for example, in powder metallurgy applications because the present invention is capable of imparting domains of inorganic compounds on powdered metals as substrates. The presence of domains of inorganic compounds on metal powders may be useful, for example, as sintering aids, grain growth inhibitors, or phase stabilizers.

The present invention may also be useful, for example, in ceramic powder and glass applications because the present invention is capable of imparting domains of inorganic compounds on ceramic powders and glasses as substrates. The presence of domains of inorganic compounds on ceramic powders may be useful, for example, as sintering aids, grain growth inhibitors, phase stabilizers, or other dopants.

The present invention may also be useful in applications where it is desirable to have magnetic or magnetizable domains in or on particles. For example, magnetic or magnetizable domains may be useful to isolate particles from or immobilize particles in a mixture where the particles have been used to catalyze, separate, purify or concentrate components of the mixture. Catalytic, separation, purification and concentration processes include, for example, ultrafiltration, chromatography, ion-exchange separation and affinity separations.

The present invention may also provides an alternative method to photolithography to produce conductive pathways on a surface. For example, it may be possible to deposit metal-loaded polymers along a continuous, predetermined portion of a surface, and remove the polymers to leave behind a conductive path of domains of inorganic compounds on the surface.

EXAMPLES

The following is a general procedure suitable for preparing a styrene divinylbenzene emulsion polymer having a particle size in the range of from 10 to 15,000 nanometers. A monomer emulsion is prepared by stirring vigorously under a nitrogen atmosphere 370 g of deoxygenated water, 48.2 g of the sodium salt of an alkyl aryl polyether sulfonate surface-active agent containing 28% solids, 348.8 g of styrene and 51.2 g of commercial-grade divinylbenzene (54.7% divinylbenzene, balance essentially ethylvinylbenzene). An aqueous initiator solution is prepared by dissolving 2.0 g of potassium persulfate in 100 g of deoxygenated water, and 50 g of the monomer solution is added to the initiator solution. The mixture is stirred to develop a 1-inch vortex and is heated to 70° C. under the nitrogen atmosphere. When polymerization begins, as evidenced by a sudden decrease in opacity, the remaining monomer emulsion is added over a period of 1.5 hours. The temperature is held at 70° C. for one hour after the addition is completed. The polymer emulsion is cooled to room temperature and filtered through cheesecloth. If desired, the emulsion polymer prepared above can, for example, be sulfonated to produce a strong acid resin, or it can be chloromethylated and quaternized with, for example, methyl chloride or methyl iodide to form a strong base emulsion polymer.

Example 1

Loading of a Single Metal Ion into a Weak Acid Emulsion Polymer to Form Cerium Oxide Domains On γ-Alumina A neutralized polymer emulsion was formed by adding to a flask: (a) 30.88 g of a 16.19 weight percent aqueous emulsion of an ultrafiltered emulsion polymer (average particle size of 103 nm) having a monomer composition of 35 percent by weight of methacrylic acid, 60 percent by weight of ethylacrylate and 5 percent by weight of allylmethacrylate, and (b) 13.59 ml of 0.92M aqueous $NH_4OH$ to adjust the pH of the emulsion to 8.2. To the neutralized polymer emulsion was pipetted 530 milligrams of cerium as an aqueous cerium acetate solution to form a cerium-loaded polymer emulsion. The contents of the flask were mixed by placing the flask on a shaker for 30 minutes.

To a 4 liter beaker equipped with a magnetic stir bar was added 5.89 grams of γ-alumina and 800 milliliters of ultrapure water. The cerium-loaded polymer emulsion was added dropwise to the stirring water/γ-alumina mixture. Upon complete addition of cerium-loaded polymer emulsion, the entire mixture formed a floc, which was collected by filtration and then dried overnight in an oven at 110° C. 900 ml of filtrate was collected, analyzed by inductively coupled plasma spectroscopy ("ICP") and found to contain 0.11 ppm of cerium ion.

The powder was heated in air at a temperature of 250° C. for one hour, then heated in air at a temperature of 350° C. for an hour. The powder was separated into aliquots which were heated for four hours at the temperatures shown in the Table 1, below.

Example 2

Loading of a Metal Ion and a Metal Complex into a Single Strong Acid Emulsion Polymer to Form Platinum/Ceria Domains on γ-Alumina A 1 percent by weight aqueous polymer emulsion was formed by adding to a flask: (a) 53.94 g of a 9.27 percent by weight aqueous emulsion of an ultrafiltered sulfonated emulsion polymer having a monomer composition of 87 percent by weight styrene and 13 percent by weight divinylbenzene (average particle size of 230 nm), and (b) 446 ml of ultrapure water. To the 1 percent by weight aqueous polymer emulsion was pipetted 14 milligrams of platinum as an aqueous tetraamine platinum ($Pt(NH_3)_4^{2+}$) solution, and 887 milligrams of cerium as an aqueous cerium nitrate solution to form a metal-loaded polymer emulsion. The contents of the flask were mixed by placing the flask on a shaker for 30 minutes.

To a 4 liter beaker equipped with a magnetic stir bar was added 5.89 grams of γ-alumina and 800 milliliters of ultrapure water. The metal-loaded polymer emulsion was added dropwise to the stirring water/γ-alumina mixture. Upon complete addition of cerium-loaded polymer emulsion, the entire mixture formed a floc, which was collected by filtration and then dried overnight in an oven at 110° C. 3.25 liters of dried filtrate powder was collected, analyzed by ICP and found to contain 0.17 ppm of platinum ion and 0.17 ppm of cerium ion.

The powder was heated in air at a temperature of 250° C. for one hour, then heated in air at a temperature of 350° C. for an hour. The powder was separated into aliquots which were heated for four hours at the temperatures shown in the Table 1 below.

The reported crystallite sizes in all of the tables below were determined by XRD from Scherrer's Equation, using Cu $Ka_1$ x-rays (wavelength=1.5405 Å).

TABLE 1

| | Ceria Crystallite Size (nm) | |
|---|---|---|
| Temperature | Example 1 | Example 2 |
| 500 | 5.3 | not measured |
| 600 | 6.5 | not measured |
| 700 | 9.0 | 31.4 |
| 800 | 16.9 | 40.4 |
| 900 | 22.3 | 34.0 |
| 1000 | 26.3 | 47.9 |
| 1100 | 47.5 | not measured |

Examples 1 and 2 show that domains can be formed on a substrate from polymers loaded with either a single metal species or a polymer loaded with more than one metal species. The data appearing in the Table 1, above, show that the domains formed by the present invention remain as domains even when exposed to elevated temperatures. The data for the samples appearing in Table 1, above, were generated by X-ray diffraction analysis.

Examples 3–6

Loading of One Metal in a Strong Base Polymer, Electrophoretically Depositing it onto a Substrate and Forming Metal Domains on the Substrate An electrodepositable polymer emulsion of a metal-loaded emulsion polymer and an electrodeposition aid was prepared by combining (a) 10.0 grams of a 7.5 percent by weight aqueous emulsion of a methyl chloride quaternized emulsion polymer (average particle size of 120 nm) having a monomer composition of 60 percent by weight dimethylaminoethylmethacrylate, 35 percent by weight styrene and 5 percent by weight divinylbenzene, loaded with metal and (b1) 90.0 grams of a 10 percent by weight aqueous emulsion (average particle size of 100 nm) of a solution polymer having a monomer composition of 8 percent by weight dimethylaminoethylmethacrylate, 17 percent by weight ethylacrylate, 75 percent by weight methylmethacrylate, (b2) 22.92 grams pentaacryloxypentaerythritol and 27.5 g of 2-ethylhexanol.

The substrate was prewetted with the electrodepositable polymer emulsion, attached to the positive terminal of a power supply and clamped to a beaker at a distance of approximately one centimeter from a stainless steel probe which was attached to the negative terminal of the power supply. The electrodepositable polymer emulsion was added to the beaker such that the substrate and the probe were 75 percent immersed in the electrodepositable polymer emulsion. The beaker was then immersed in a constant temperature water bath maintained at 38° C. A potential of 18–100 volts was applied at up to 250 milliamperes for from 1 second to 30 seconds. After the voltage was applied the substrate containing the electrodeposited polymer was rinsed with deionized water and dried with compressed air, then dried in an oven at a temperature of 110° C. for 2 minutes. The substrate containing the electrodeposited polymer was heated in air at a temperature of 250° C. for one hour, then heated in air at a temperature of 350° C. for an hour.

The data appearing in Table 2, below, show the metals and substrates used according to the above procedure.

TABLE 2

| Example | Metal | Amount[1] | Substrate |
|---------|-------|-----------|-----------|
| 3 | Pt | 0.15 | Stainless steel coupon |
| 4 | Pt | 0.15 | Stainless steel mesh |
| 5 | Pt | 0.15 | Woven carbon fibers |
| 6* | Ru | 0.05 | Titanium foil |

[1]The "Amount" reported is the number of grams of metal loaded per gram of emulsion polymer
*Prepared using the weak acid emulsion polymer described in Example 1. The electrodeposition aid (b1) was an emulsified solution polymer having a monomer composition of 50 percent by weight of an acrylic acid copolymer (10 percent by weight methacrylic acid, 8.7% percent by weight hydroxyethyl methacrylate, 43.9 percent by weight methyl methacrylate and 37.4 percent by weight butyl acrylate).

In each of Examples 3–6, the presence of the metal on the substrate after pyrolysis was confirmed by XRF. The examples in the table above show that a metal loaded polymer in combination with an electrodeposition aid can be electrophoretically deposited onto a variety of electrically conductive substrates.

Example 7

Loading of a Strong Base Emulsion Polymer With Two Metal Complexes to Form Domains of a Bimetallic Alloy on a Substrate
Preparation of 1:9 weight ratio Au/Pt alloy on gamma alumina using strong base polymer 918 mg of platinum as an aqueous hexachloroplatinate solution and 102 mg of gold as a tetrachloroaurate solution were added dropwise to a 170.0 gram sample of a 5.0 percent by weight aqueous emulsion of an emulsion polymer (average particle size of 120 nm) having a monomer composition of 60 percent by weight dimethylaminoethylmethacrylate, 35 percent by weight styrene and 5 percent by weight divinylbenzene, to form a metal-loaded polymer emulsion. The metal-loaded polymer emulsion was stirred overnight and then 3.00 g of gamma aluminum oxide powder was added which formed a floc. The floc was collected by filtration, dried overnight in an oven at 110° C., heated in air at a temperature of 350° C. for 1 hour, and then heated in air at a temperature of 500° C. for 1 hour.

X-ray diffraction of the final powdered product showed a single peak centered at 39.4°, which is located between the gold diffraction peak at 37° and platinum diffraction peak at 39.7°. The diffraction peak was shifted slightly relative to platinum's diffraction peak toward gold's diffraction peak indicating the presence of a Au/Pt alloy. This alloy appeared to be metastable because X-ray diffraction of samples further heated in air to 600° C. showed two separate lines at 39.6° and 38.5° indicating two distinct phases of platinum and gold respectively.

These results are especially surprising because the phase diagram of platinum and gold indicate that solid solutions of gold and platinum are not stable between 15 and 100 percent by weight platinum.

Example 8

Two Polymers, One Loaded With a Single Metal Complex, the Other Loaded With Two Metal Ions
Pt/Strong Base Polymer To a stirred flask containing 0.50 g of platinum as an aqueous hexachloroplatinic acid solution was added 261.23 g of a 9.57 percent by weight aqueous emulsion of a methyl chloride quaternized emulsion polymer (average particle size of 150 nm) having a monomer composition of 60 percent by weight dimethylaminoethylmethacrylate, 35 percent by weight styrene and 5 percent by weight divinylbenzene to form a first metal-loaded polymer.
Ce/Al/Weak Acid Polymer A neutralized polymer emulsion was formed by adding to a second flask: (a) 303.83 g of a 16.45 weight percent aqueous emulsion of an emulsion polymer (average particle size of 103 nm) having a monomer composition of 40 percent by weight of methacrylic acid, 60 percent by weight of ethylacrylate and 5 percent by weight of allylmethacrylate, and (b) 150 ml of 1.0M aqueous $NH_4OH$. To the neutralized polymer emulsion was pipetted 5.0 g of cerium as an aqueous cerium nitrate solution and 0.045 g of aluminum as an aqueous aluminum nitrate solution to form a second metal-loaded polymer emulsion containing two metals. The contents of the flask were mixed by placing the flask on a shaker for 30 minutes.

To a beaker containing 122.11 g of the second metal-loaded polymer emulsion was added dropwise 30 g of the first metal-loaded polymer emulsion. Water was also added to avoid excess thickening of mixture, and the pH of the emulsion was maintained at a pH of 8.0 by the addition of ammonium hydroxide. A floc formed which was collected by filtration.

To a beaker equipped with a magnetic stir bar was added 127.9 grams of Γ-alumina and 800 milliliters of deionized water. The floc collected above and an additional 1.2 grams of the strong-base emulsion polymer (unloaded) was added to the stirred alumina suspension. Upon complete addition of the floc and the strong-base emulsion polymer, the entire mixture formed a uniform floc, which was collected by filtration and then dried overnight in an oven at 110° C. 1.53 liters of filtrate was collected, analyzed by ICP and found to contain 2.28 ppm of platinum and 0.02 ppm of cerium, indicating that the metal complex and metal ions are still complexed with the polymers.

The powder was heated in air at a temperature of 250° C. for one hour, then heated in air at a temperature of 350° C. for an hour, then heated in air at a temperature of 500° C. for four hours. The sample was divided into portions which were further heated in air to the temperatures shown in Table 3 below.

The data reported in Table 3, below, are crystallite size determined by the XRD powder patterns of the samples prepared according to the procedure of Example 8 and heated in air at the temperatures and times shown.

TABLE 3

| Temperature | Time | Ceria 2Θ = 28.4° | 2Θ = 32.8° | Platinum 2Θ = 39.7° |
| --- | --- | --- | --- | --- |
| 500° C. | 4 hours | 4.4 | 4.3 | 9.3 |
| 800° C. | 1 hour | 11 | 10 | 23 |
| 1000° C. | 1 hour | 46 | 44 | 67 |

The data in Table 3 shows that the present invention can be used to generate domains of two or more metals on a substrate by using metal-loaded polymers wherein the metal loaded-polymers contain different metal species.

Example 9

Two or More Metals Loaded into Two Polymers: Ground Ion Exchange Polymer and Strong Acid Emulsion Polymer
Rh/Ground Reducing Polymer An amineborane functionalized styrene/divinyl benzene suspension polymer was prepared according to the method described in U.S. Pat. No. 4,355,140 to Manziek. A sample of the polymer was finely ground then ultrafiltered through a column having a molecular weight cutoff of 500,000. To a flask equipped with a magnetic stirrer was added 244.14 g of the ground, ultrafiltered polymer (average particle size of 300 nm) and 0.125 g of rhodium as an aqueous rhodium trichloride solution. The contents of the flask were stirred to form a first metal-loaded polymer mixture.

Zr & Y/Strong Acid Polymer

A second metal-loaded polymer emulsion was formed by stirring 500 g of a 10.8 percent by weight aqueous emulsion of a sulfonated emulsion polymer having a monomer composition of 87 percent by weight styrene and 13 percent by weight divinylbenzene (average particle size of 230 nm), and adding, dropwise, two metal ion solutions: 4.425 g of zirconium as an aqueous zirconium sulfate solution and 0.150 g of yttrium as an yttrium nitrate solution. After the addition of the metal ion solutions, ammonium hydroxide was added to adjust the pH to within the range of from 3 to 4.

To a first beaker containing 62.74 g of the second metal-loaded polymer emulsion was added dropwise 60 g of the first metal-loaded polymer mixture. Water was also added to avoid excess thickening of mixture.

To a second beaker equipped with a magnetic stir bar was added 2.22 grams of γ-alumina and 800 milliliters of deionized water. The contents of the first beaker were added dropwise to the stirred contents of the second beaker. Upon complete addition of the contents of the first beaker the entire mixture formed a floc, which was collected by filtration and then dried overnight in an oven at 110° C. 1.50 liters of filtrate was collected, analyzed by ICP and found to contain less than 0.1 ppm of rhodium and less than 0.1 ppm of zirconium, indicating that the metal complex and metal ions are still complexed with the polymers.

The powder was heated in air at a temperature of 250° C. for one hour, then heated in air at a temperature of 350° C. for an hour, then heated in air at a temperature of 500° C. for four hours. The sample was divided into portions which were further heated in air to the temperatures shown in Table 3 below.

The data reported in Table 4, below, are crystallite size determined by the XRD powder patterns of the samples prepared according to the procedure of Example 9 and heated in air at the temperatures and times shown.

TABLE 4

| Temperature | Time | Zirconia 2Θ = 30.3° |
| --- | --- | --- |
| 500° C. | 4 hours | <3 |
| 800° C. | 1 hour | 10 |
| 1000° C. | 1 hour | 53 |

Analysis of the XRD indicated that the zirconia formed by this process was predominately in the tetragonal crystalline phase, cubic crystalline phase or a combination thereof. These forms are considered thermodynamically unstable at room temperature in the absence of a phase stabilizer such as yttria. Thus, the data indicate that the zirconia domains are phase stabilized as a result of phase stabilizing components within the zirconia domains.

Example 10

Catalytic Activity

To a heavy-walled 500 ml Parr flask equipped with a pressure gauge and shaker was added 0.501 g of the product prepared in Example 2 (platinum/cerium oxide domains on gamma-alumina), 3.16 ml of mesityl oxide and 46.8 g of de-ionized water. The flask was sealed, the head-space was evacuated, hydrogen was added to the flask and the flask was shaken continuously. The reaction was monitored by following the consumption of hydrogen on a pressure gauge. After 60 minutes greater then 90 percent of the mesityl oxide had been converted to methylisobutylketone as determined by gas chromatography.

Example 11

Multiple Coatings of Metal-Loaded Polymers

General procedure: Several honeycomb cordierite substrates (five having a cell density of 300 cells per square inch and five having a cell density of 400 cells per square inch) were dip-coated by immersing in a solution or emulsion of metal-loaded polymer for two minutes. The excess solution was allowed to drain and then the channels were cleared with an air gun at a pressure of between 5 and 20 psig. The cordierite substrates were dried in an oven at 110° C. for 2 hours and then heated in air to 250° C. for 10 minutes and 350° C. for 10 minutes.

This general procedure was performed a total of six times using the following metal-loaded polymer solutions and emulsions in the following order:

The polymer of the second metal-loaded polymer of Example 8 loaded with lanthanum and aluminum.
The polymer of the first metal-loaded polymer of Example 8 loaded with palladium.
The second metal-loaded polymer of Example 8.
The first metal-loaded polymer of Example 8.
The second metal-loaded polymer of Example 9.
The first metal-loaded polymer of Example 9.

Elemental analysis by XRF of the final cordierite substrates indicated the presence of all of the metal ions present in the metal-loaded polymers. The "Intensity" data appearing in Table 5, below, are the counts per second detected by XRF:

| Element | Intensity Counts/Second |
|---|---|
| Al* | 2595.6 |
| Y | 17.8 |
| Zr | 586.8 |
| Rh | 5.6 |
| Pd | 14.9 |
| La | 30.6 |
| Ce | 84.3 |
| Pt | 12.9 |

*The cordierite substrates comprise aluminum.

The data in Table 5 show that domains of metals from each of the metal-loaded polymers contacted with the cordierite substrate were deposited thereon.

Example 12

The catalytic activity the metal-containing cordierite substrates having 300 cells per square inch prepared in Example 11 was evaluated using a synthetic automobile exhaust gas having the following composition: 500 ppm nitric oxide, 1200 ppm propylene, 1700 ppm hydrogen, 1.56% oxygen, 1.88% carbon monoxide, 10% carbon dioxide, 10% water, and 76.3% nitrogen. The ratio of CO to $O_2$ was varied between 2:1 to 1:3 at a frequency of 0.5 Hz to simulate the feedback control system in current production automobile; the percentages of CO and $O_2$ listed above were time weighted averages. The metal-containing cordierite substrates were placed in stainless steel reactor cylinders having an inner diameter of 0.435 inches. The synthetic automobile exhaust gas was passed through the reactor cylinders at a flow rate of from 0.5 to 1 liter per minute (which corresponds to a space velocity of between 5,000 and 7,500 per hour).

The gases appearing in Table 6, below, were directly analyzed by FT-IR spectroscopy. The temperature at which 25, 50 and 90 percent of the reactant gas species is converted is reported in Table 6, below, as $T_{25}$, $T_{50}$ and $T_{90}$, respectively. The temperature at which 50% of a gas species is consumed, or $T_{50}$, is often described as the light-off temperature for that gas species.

TABLE 6

| Gas Species | $T_{25}$ | $T_{50}$ | $T_{90}$ |
|---|---|---|---|
| carbon monoxide | 224° C. | 240° C. | 271° C. |
| propylene | 226° C. | 243° C. | 275° C. |
| nitric oxide | 232° C. | | |

Example 13

Co-Extrusion of a Metal Loaded Polymer with a Cordierite Precursor Formulation

A metal-loaded polymer emulsion was formed by adding to a flask: 46.72 g of a 27.4 weight percent aqueous emulsion of an emulsion polymer (average particle size of 87 nm) having a monomer composition of 35 percent by weight of methacrylic acid, 60 percent by weight of ethylacrylate and 5 percent by weight of allylmethacrylate, and pipetting 956.5 milligrams of cerium as an aqueous cerium acetate solution and 499.5 milligrams of platinum as an aqueous tetraamine platinum solution to form a metalloaded polymer emulsion. To the metal-loaded polymer emulsion was added 1.79 ml of 14.8M aqueous $NH_4OH$ to adjust the pH of the emulsion to 8.2, 0.5 g of an ammonium salt of poly(acrylic acid) having molecular weight 1,000 and a sufficient amount of water to form a 31% by weight solids emulsion. The contents of the flask were mixed by placing the flask on a shaker for 30 minutes.

A cordierite precursor formulation, as disclosed in U.S. Pat. No. 4,551,295 to Gardner, was prepared from the following components (in parts by weight):

| Talc: | 40.21 |
|---|---|
| Alumina: | 13.47 |
| Hydroxypropyl Cellulose: | 3.0 |
| Diglycol Stearate: | 1.0 |
| Kaolin | 46.32 |

50 g of the cordierite precursor formulation and 15.5 g of the metal-loaded polymer emulsion were mixed in a Haake Rheocord equipped with sigma blade for 15 minutes. The resulting paste was then extruded using a Gottfert capillary rheometer using a multi-hole die with openings of approximately 1 millimeter and a constant shear rate. The product was air dried and was heated in air at a temperature of 250° C. for one hour, then heated in air at a temperature of 350° C. for an hour, then heated in air at a temperature of 1000° C. for two hours to form the final metal-containing cordierite.

Hydrogen chemisorption of the final metal-containing cordierite indicated that 2.1% of the platinum present in the extrudate was exposed.

Example 14

The catalytic activity of the final metal-containing cordierite was evaluated using the same procedure as described in Example 12.

The gases appearing in Table 7, below, were directly analyzed by FT-IR spectroscopy. The temperature at which 25 and 50 percent of the reactant gas species is converted is reported in Table 7, below, as $T_{25}$, and $T_{50}$ respectively.

TABLE 7

| Gas Species | $T_{25}$ | $T_{50}$ |
|---|---|---|
| carbon monoxide | 449° C. | 486° C. |
| propylene | 426° C. | 459° C. |
| nitric oxide | 378° C. | 474° C. |

We claim:
1. A method for making a composite, comprising:
  (a) forming one or more metal-loaded polymers by loading one or more soluble metal compounds into each of one or more polymers wherein each of the one or more polymers has a particle size in the range of from 10 nanometers to 15,000 nanometers to form one or more metal-loaded polymers;
  (b) contacting a support material with each of the one or more metal-loaded polymers; and
  (c) removing the one or more polymers to form a composite.
2. A method for making a composite, comprising:
  (a) forming a first set of one or more polymers by loading one or more soluble metal compounds into each of one or more polymers wherein each of the polymers has a particle size in the range of from 10 nanometers to 15,000 nanometers to form a first set of one or more metal-loaded polymers;

(b) forming a second set of one or more metal-loaded polymers by loading one or more soluble metal compounds into each of one or more polymers wherein each of the polymers has a particle size in the range of from 10 nanometers to 15,000 nanometers to form a second set of one or more metal-loaded polymers;

(c) contacting a support material with the first set of one or more metal-loaded polymers;

(d) removing the polymer to form a composite;

(e) contacting the second set of one or more metal-loaded polymers with the composite of (d) above; and (f) removing the polymer to form a composite.

3. The method of claim 1 or claim 2, wherein: the polymer is selected from the group consisting of emulsion polymers and ground suspension polymers.

4. The method of claim 1 or claim 2, wherein: the one or more soluble metal compounds is selected from the group consisting of metals, metal ions, metal complexes and mixtures thereof, wherein:

(a) the metal is selected from the group consisting of platinum, palladium, rhodium, rhenium, ruthenium, osmium, iridium, cerium, zirconium, titanium, vanadium, molybdenum, tungsten, lanthanum, aluminum, yttrium, nickel, tin, bismuth, copper, cobalt, iron, silver, gold and mixtures thereof; and (b) the metal ion is selected from the group consisting of $Ce^{3+}$, $Ni^{2+}$, $Zr^{4+}$, $La^{3+}$, $Al^{3+}$, $Y^{3+}$ and mixtures thereof; and the metal complex selected from the group consisting of $RuCl_3$, $RhCl_3$, $[PtCl_6]^{2-}$, $[Pt(NH_3)_4]^{2-}$, $[PdCl_4]^{2-}$, $Fe(CO)^{4-}$, $[Ru(NH_3)_6]^{3+}$, $[MoO_4]^{2-}$, $[Mo_6O^{19}]^{2-}$ and mixtures thereof.

5. The method of claim 1 or claim 2, wherein: the support material is selected from metals, metal oxides, metal carbides, metal nitrides, metal borides, metal silicides, carbonaceous materials, thermally stable polymers and composites thereof.

6. The method of claim 1 or claim 2, wherein: the support material is selected from steel, platinum, titanium, silicon, alumina, magnesium oxide, titanium oxide, zirconium oxide, cerium oxide, silicon oxide, cordierite, zeolites, mullite, glass, graphite, amorphous carbon, silicon nitride, silicon carbide, tungsten carbide, nickel boride and thermally stable plastics.

7. The method of claim 1 or claim 2, wherein: the polymer is removed by a process selected from the group consisting of pyrolysis, dissolution, chemical degradation, irradiation and sonication.

8. The method of claim 1 or claim 2, wherein: the polymer is removed by pyrolysis.

9. A composite, comprising:

(a) a support material having one or more surfaces capable of supporting domains; and (b) a plurality of domains on the one or more surfaces of the support material, wherein the domains comprise one or more inorganic compounds selected from the group consisting of metal oxides, and wherein the domains have a diameter of from 0.4 to 100 nanometers.

10. The composite of claim 9, wherein: the metal oxides are selected from the group consisting of oxides of platinum, palladium, rhodium, rhenium, ruthenium, osmium, iridium, cerium, zirconium, titanium, vanadium, molybdenum, tungsten, lanthanum, aluminum, yttrium, nickel, tin, bismuth, copper, cobalt, iron, silver, gold and mixtures thereof.

11. A composite, comprising:

(a) a support material having one or more surfaces capable of supporting domains; and (b) a plurality of domains on the one or more surfaces of the support material, wherein the domains comprise two or more inorganic compounds, and wherein the domains have a diameter of from 0.4 to 1,000 nanometers.

12. The composite of claim 9 or claim 11, wherein: the inorganic compounds have structures selected from the group consisting of amorphous structures, crystalline structures, alloys and combinations thereof.

13. The composite of claim 11, wherein: the domains have a diameter of from 0.8 to 700 nanometers.

14. The composite of claim 9 or claim 11, wherein: the domains comprise zirconium oxide in a crystalline phase selected from the group consisting of tetragonal, cubic and a combination thereof, wherein the zirconium oxide contains less than 3 percent by weight of any phase stabilizers.

15. The composite of claim 11, wherein: the inorganic compounds are selected from the group consisting of platinum, palladium, rhodium, rhenium, ruthenium, osmium, iridium, cerium, zirconium, titanium, vanadium, molybdenum, tungsten, lanthanum, aluminum, yttrium, nickel, tin, bismuth, copper, cobalt, iron, silver, gold, oxides thereof and mixtures thereof.

16. The composite of claim 9 or claim 11, wherein: the support material is selected from metals, metal oxides, metal carbides, metal nitrides, metal borides, metal silicides, carbonaceous materials, thermally stable polymers and composites thereof.

17. The composite of claim 9 or claim 11, wherein: the support material is selected steel, platinum, titanium, silicon, alumina, magnesium oxide, titanium oxide, zirconium oxide, cerium oxide, silicon oxide, cordierite, zeolites, mullite, glass, graphite, amorphous carbon, silicon nitride, silicon carbide, tungsten carbide, nickel boride and thermally stable plastics.

18. A catalyst comprising the composite of claim 9 or claim 11.

19. The catalyst of claim 18, wherein: the support material is a honey-combed monolith.

20. A fuel cell comprising the composite of claim 9 or claim 11.

21. An article having an emissivity coating comprising the composite of claim 9, or claim 11.

22. An optoelectronic device comprising the composite of claim 9 or claim 11.

23. A superconductor comprising the composite of claim 9 or claim 11.

24. A ceramic material comprising the composite of claim 9 or claim 11.

* * * * *